United States Patent
Yeh et al.

(10) Patent No.: US 9,111,687 B2
(45) Date of Patent: Aug. 18, 2015

(54) ELECTROLYTE COMPOSITION FOR DYE-SENSITIZED SOLAR CELL

(71) Applicant: Eternal Chemical Co., Ltd.

(72) Inventors: Wei-Ting Yeh, Kaohsiung (TW); An-I Tsai, Kaohsiung (TW)

(73) Assignee: Eternal Materials Co., Ltd., Kaohsiung (TW)

( * ) Notice: Subject to any disclaimer, the term of this patent is extended or adjusted under 35 U.S.C. 154(b) by 148 days.

(21) Appl. No.: 13/893,214

(22) Filed: May 13, 2013

(65) Prior Publication Data

US 2014/0175325 A1  Jun. 26, 2014

(30) Foreign Application Priority Data

Dec. 24, 2012  (TW) .............................. 101149532 A

(51) Int. Cl.
*H01G 9/20* (2006.01)

(52) U.S. Cl.
CPC ........... *H01G 9/2013* (2013.01); *H01G 9/2004* (2013.01); *H01G 9/2031* (2013.01); *H01G 9/2059* (2013.01); *Y02E 10/542* (2013.01)

(58) Field of Classification Search
USPC ........................................ 136/243, 264, 252
See application file for complete search history.

(56) References Cited

U.S. PATENT DOCUMENTS

| | | | |
|---|---|---|---|
| 8,492,646 B2 * | 7/2013 | Tsai et al. ...................... | 136/252 |
| 2005/0194040 A1 * | 9/2005 | Hirose .......................... | 136/263 |
| 2007/0048621 A1 | 3/2007 | Kashida et al. | |
| 2010/0307577 A1 * | 12/2010 | Chen et al. ..................... | 136/256 |
| 2010/0308254 A1 * | 12/2010 | Tsai et al. ..................... | 252/62.2 |
| 2013/0146143 A1 * | 6/2013 | Maruyama .................... | 136/263 |
| 2013/0206235 A1 * | 8/2013 | Maruyama .................... | 136/263 |

FOREIGN PATENT DOCUMENTS

| | | | |
|---|---|---|---|
| EP | 2455955 | * | 5/2012 |
| TW | 201043662 A | | 12/2010 |
| TW | 201247633 A | | 12/2012 |
| WO | WO 2012/026538 | * | 3/2012 |
| WO | WO 2012/057325 | * | 5/2012 |

\* cited by examiner

*Primary Examiner* — Carol M Koslow
(74) *Attorney, Agent, or Firm* — Mintz Levin Cohn Ferris Glovsky and Popeo, P.C.

(57) ABSTRACT

An electrolyte composition for a dye-sensitized solar cell (DSSC) is provided, which includes a redox couple solution and inorganic nanoparticles. The surface of the inorganic nanoparticle may have a substituted or unsubstituted silane group, an ether group, a substituted amino group, a carbonyl group, an ester group, an amide group or a combination thereof.

9 Claims, No Drawings

ELECTROLYTE COMPOSITION FOR DYE-SENSITIZED SOLAR CELL

RELATED APPLICATIONS

This application claims priority to Taiwan Application Serial Number 101149532, filed Dec. 24, 2012, which is herein incorporated by reference.

BACKGROUND

1. Technical Field

The present disclosure relates to an electrolyte composition for a dye-sensitized solar cell (DSSC).

2. Description of Related Art

A dye-sensitized solar cell (DSSC) is recognized as one of the new generation solar cells for advantages like simple processing, easy mass production and low cost. Generally, the DSSC includes an anode, a semiconductor layer (e.g., a titanium dioxide layer), dye, a counter electrode and electrolyte. The electrolyte is used to transfer holes to the counter electrode, such that the ion conductivity of the redox couple would have critical influence on the photoelectric conversion efficiency of the DSSC. In addition, the electrolyte ideally requires the features of low volatility, less leakage and easy packaging.

In order to meet the requirement of the electrolyte on low volatility and less leakage, researchers developed a wide range of electrolyte compositions. Taiwan (R.O.C) Patent Publication No. 201043662 provided a polymer-containing gel electrolyte, which may further include nanoparticles to increase the ion conductivity. Since the gel electrolyte has a certain viscosity, the sedimentation rate of the inorganic particles from the gravity can be slowed down. Nevertheless, the ion conductivity is thus decreased due to the viscosity of the gel electrolyte. Therefore, the transfer rate of the hole cannot be effectively increased so as not to increase the photoelectric conversion efficiency of the solar cell, even though the nanoparticles are added into the gel electrolyte. Concerning the type of liquid electrolyte, although liquid electrolyte exhibits high ion conductivity and electrode permeability, it is not suitable for adding nanoparticles therein to increase the ion conductivity for its high fluidity.

Accordingly, there is a need for an electrolyte composition having inorganic nanoparticles hard to subside, so as to increase the photoelectric conversion efficiency of the DSSC.

SUMMARY

An electrolyte composition for a dye-sensitized solar cell (DSSC) is provided, which includes a redox couple solution and an inorganic nanoparticle.

According to one embodiment of the present disclosure, the surface of the inorganic nanoparticle has a substituted or unsubstituted silane group, an ether group, a substituted amino group, a carbonyl group, an ester group, an amide group or a combination thereof.

According to one embodiment of the present disclosure, the inorganic nanoparticle has a content of from 0.1 to 20 wt %, based on the total weight of the electrolyte composition.

According to one embodiment of the present disclosure, the inorganic nanoparticle is selected from the group consisting of titanium dioxide, silicon dioxide, zinc oxide, aluminum oxide, cadmium sulfide, zirconium oxide, calcium phosphate, calcium oxide and a combination thereof.

According to one embodiment of the present disclosure, the inorganic nanoparticle has a diameter in a range of 1 to 100 nm.

According to one embodiment of the present disclosure, the substituted or unsubstituted silane group has a structure represented by the following Chemical Formula (1):

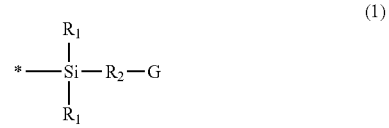

in which $R_1$ is selected from the group consisting of H, OH, $OCH_3$, $OC_2H_5$ and $OCOCH_3$, and $R_2$ is selected from the group consisting of C1-C7 linear and branched alkyl, and G is selected from the group consisting of $CH_3$, $C_2H_4$, $CF_3$, Cl, $NH_2$, $N(CH_3)_2$, cyclopentane and —$OC(O)C(CH_2)CH_3$

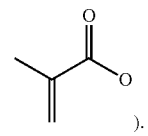

According to one embodiment of the present disclosure, the ether group has a structure represented by the following Chemical Formula (2):

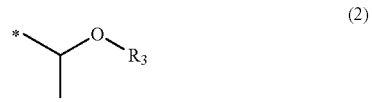

in which $R_3$ is selected from the group consisting of C1-C20 linear and branched alkyl, C3-C20 cycloalkyl, C6-C20 aryl, C1-C5 linear and branched hydroxyl, C1-C5 linear and branched carbonyl, C1-C5 linear and branched halo group and a combination thereof.

According to one embodiment of the present disclosure, the substituted amino group has a structure represented by the following Chemical Formula (3):

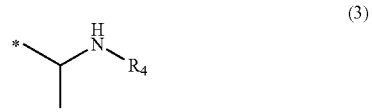

in which $R_4$ is selected from the group consisting of C1-C20 linear and branched alkyl, C3-C20 cycloalkyl, C6-C20 aryl, C1-C5 linear and branched carbonyl and a combination thereof.

According to one embodiment of the present disclosure, the carbonyl group has a structure represented by the following Chemical Formula (4):

in which $R_5$ is selected from the group consisting of C1-C20 linear and branched alkyl, C3-C20 cycloalkyl, C6-C20 aryl, C1-C5 linear and branched haloformyl and a combination thereof.

According to one embodiment of the present disclosure, the ester group has a structure represented by the following Chemical Formula (5):

(5)

in which $R_6$ is selected from the group consisting of C1-C20 linear and branched alkyl, C6-C20 aryl, C1-C20 linear alkenyl and a combination thereof.

According to one embodiment of the present disclosure, the amide group has a structure represented by the following Chemical Formula (6):

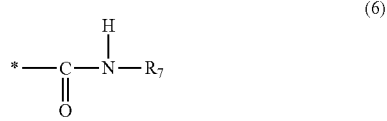

(6)

in which $R_7$ is selected from the group consisting of C1-C20 linear and branched alkyl, C6-C20 aryl, C1-C20 linear and branched isocyanato group, C6-C20 silane group and a combination thereof.

According to one embodiment of the present disclosure, the redox couple solution has a redox couple which is $I_3^-/I^-$, $Br^-/Br^-/Br_2$, Co(II)/Co(III), $SCN^-/(SCN)_2$ or $SeCN^-/(SeCN)_2$.

DETAILED DESCRIPTION

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

As used herein, the singular forms "a," "an" and "the" include plural referents unless the context clearly dictates otherwise. Therefore, reference to, for example, a data sequence includes aspects having two or more such sequences, unless the context clearly indicates otherwise.

Reference will now be made in detail to the embodiments of the present disclosure, examples of which are illustrated in the accompanying drawings. Wherever possible, the same reference numbers are used in the drawings and the description to refer to the same or like parts.

The present disclosure provides an electrolyte composition for a dye-sensitized solar cell (DSSC), which includes a redox couple solution and modified or unmodified inorganic nanoparticles. The unmodified inorganic nanoparticles can effectively scatter light to increase the photoelectric conversion efficiency of the solar cell. The modified inorganic nanoparticles can be well dispersed in the redox couple solution, so as to avoid aggregation and sedimentation and exhibit a good light-scattering effect, and thus increase the photoelectric conversion efficiency of the solar cell.

The redox couple solution can be a liquid electrolyte composition commonly used in a general DSSC, which basically includes a redox couple and solvent. In one embodiment, the redox couple is $I_3^-/I^-$, $Br^-/Br_2$, Co(II)/Co(III), $SCN^-/(SCN)_2$ or $SeCN^-/(SeCN)_2$. For examples, the solvent is acetonitrile (ACN), valeronitrile, 3-methoxypropionitrile (MPN) or a combination thereof. In addition, the electrolyte may further includes additives, such as 4-tert-butylpyridine (TBP), N-methyl-benzimidazole (MBI), 1,2-dimethyl-3-propylimidazolium iodide (DMPII), 2,3,4,6-tetra-O-acetyl-β-D-glucopyranosyl isothiocyanate (GITC), lithium iodide (LiI), sodium iodide (NaI) or a combination thereof.

The inorganic nanoparticles should have a good light-scattering effect. In one embodiment, the inorganic nanoparticle is selected from the group consisting of titanium dioxide, silicon dioxide, zinc oxide, aluminum oxide, cadmium sulfide, zirconium oxide, calcium phosphate, calcium oxide and a combination thereof.

The term "modified" refers to the surface of the inorganic nanoparticle reacted with a modifier, and a specific functional group is then grafted thereon. Specifically, the hydroxyl group of the surface of the inorganic nanoparticle reacts with a modifier to form a chemical bond, and a specific functional group is then grafted on the surface of the particle.

In one embodiment, the surface of the inorganic nanoparticle has a substituted or unsubstituted silane group, an ether group, a substituted amino group, a carbonyl group, an ester group, an amide group or a combination thereof. The functional groups on the inorganic nanoparticles exhibit structural steric hindrance to prevent aggregation of the inorganic nanoparticles. In the experimental examples, those modified inorganic nanoparticles can be suspended in the redox couple solution and no sedimentation occurs.

When the inorganic nanoparticles have a content of more than 20 wt %, those are easy to be subsided due to their high distribution density in the space. When the inorganic nanoparticles have a content of less than 0.1 wt %, the light-scattering effect is poor. Therefore, in one embodiment, the inorganic nanoparticles have a content of from 0.1 to 20 wt %, based on the total weight of the electrolyte composition.

In one embodiment, the inorganic nanoparticles have a diameter in a range of 1 to 100 nm. When the inorganic nanoparticles have a diameter less than 1 nm, those are easy to aggregate due to their large specific surface area. When the inorganic nanoparticles have a diameter higher than 100 nm, those cannot be suspended in the electrolyte solution due to their large volume and heavy weight, unable to effectively scatter light and improve the ion conductivity and the light-scattering effect.

The types of the functional groups modified on the surface of the inorganic nanoparticles and the modification methods would be described below in detail, but not limited thereto.

In one embodiment, the substituted or unsubstituted silane group has a structure represented by the following Chemical Formula (1):

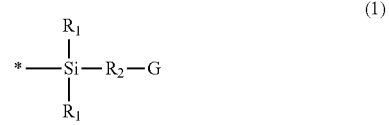

(1)

in which $R_1$ is selected from the group consisting of H, OH, $OCH_3$, $OC_2H_5$ and $OCOCH_3$, and $R_2$ is selected from the group consisting of C1-C7 linear and branched alkyl, and G is selected from the group consisting of $CH_3$, $C_2H_4$, $CF_3$, Cl, $NH_2$, $N(CH_3)_2$, cyclopentane and $-OC(O)C(CH_2)CH_3$

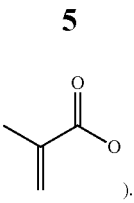

).

The structure represented by Chemical Formula (1) can be prepared according to Scheme (1).

Scheme (1)

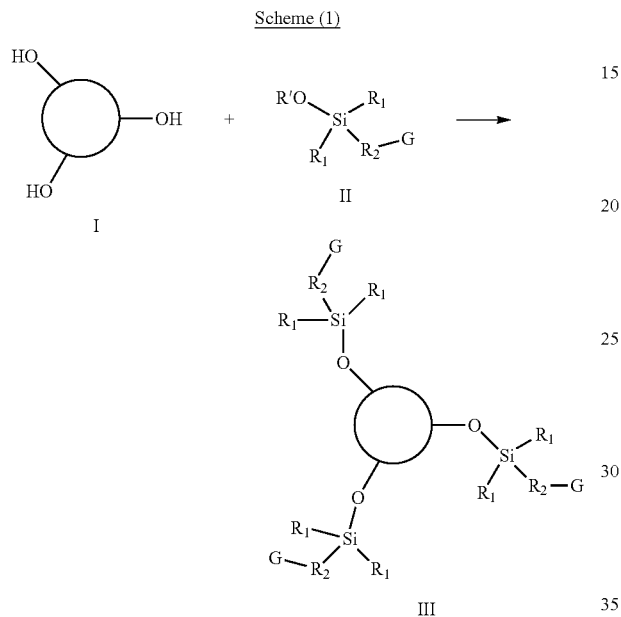

The inorganic nanoparticle I containing hydroxyl groups on the surface are reacted with the alkoxy group (—OR')-containing silane compound II. The functional groups of $R_1$, $R_2$ and G refer to the above-mentioned description. R' can be C1-C5 linear or branched alkyl group, better being C1-C3 alkyl group. For examples, the alkoxy group (—OR')-containing silane compound II may be

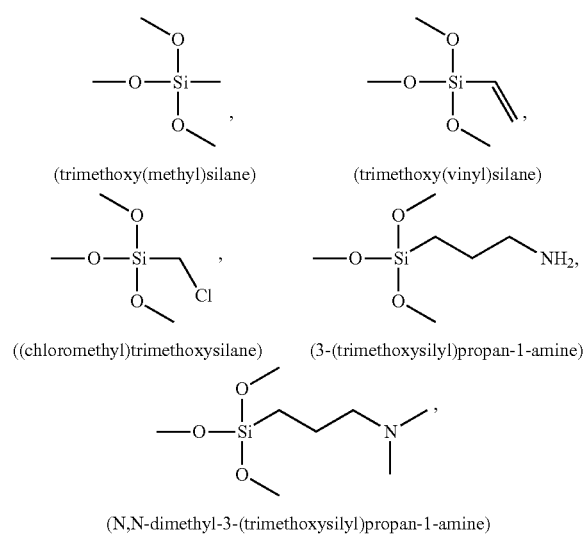

-continued

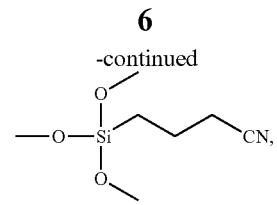

(4-(trimethoxysilyl)butanenitrile)

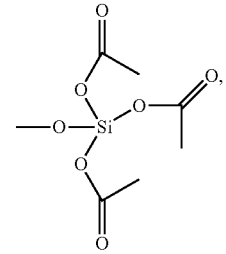

(1-methoxy-1,1,1-triacetate Silanetriol)

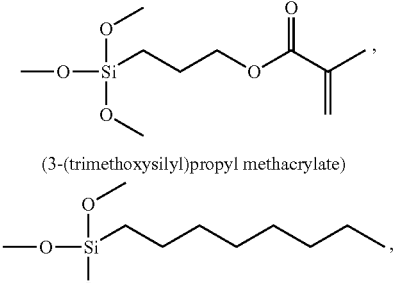

(3-(trimethoxysilyl)propyl methacrylate)

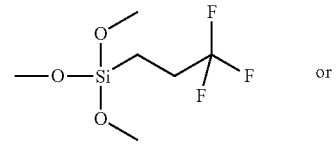

(trimethoxy(octyl)silane)

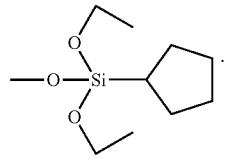 or (trimethoxy(3,3,3-trifluoropropyl)silane)

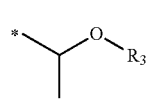

(cyclopentyldiethoxy(methoxy)silane)

The alkoxy group (—OR') is hydrolyzed and then condensed with the hydroxyl group of the inorganic nanoparticle I under appropriate moisture content and pH value so as to graft the silane group on the surface of the inorganic nanoparticle I, and thus the silane group-containing modified inorganic nanoparticle III is formed. Because the silane groups exhibit structural steric hindrance, the modified inorganic nanoparticles are hard to aggregate.

In another embodiment, the ether group has a structure represented by the following Chemical Formula (2):

$$\text{(2)}$$

in which $R_3$ is selected from the group consisting of C1-C20 linear and branched alkyl, C3-C20 cycloalkyl, C6-C20 aryl, C1-C5 linear and branched hydroxyl, C1-C5 linear and branched carbonyl, C1-C5 linear and branched halo group and a combination thereof. Preferably, the structure of the Chemical Formula (2) includes, but not limited to

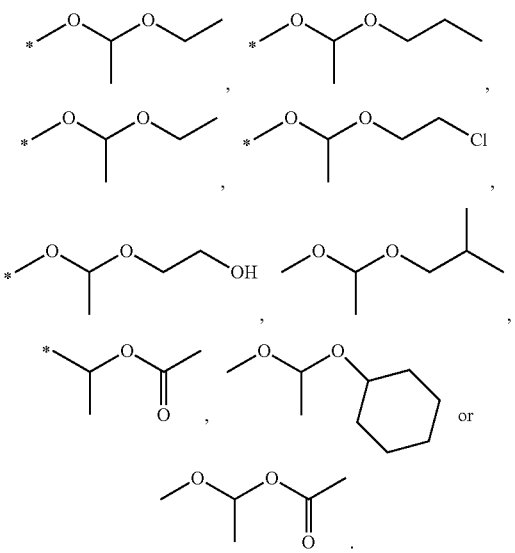

The structure represented by Chemical Formula (2) can be prepared according to Scheme (2).

Scheme (2)

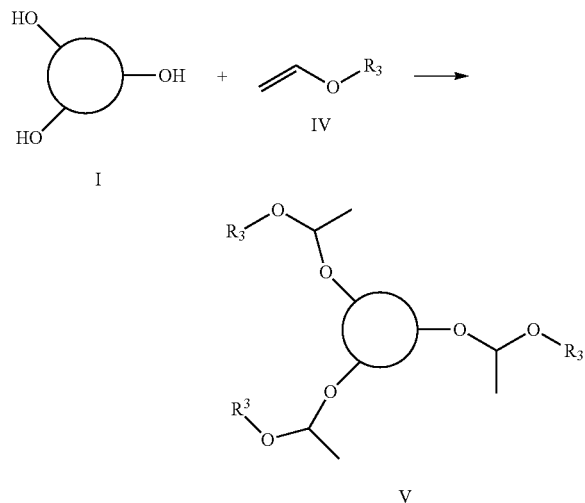

The inorganic nanoparticle I containing hydroxyl groups is reacted with an ether group-containing vinyl compound IV. In one embodiment, $R_3$ is an ethyl group, that is, the ether group-containing vinyl compound IV is ethoxyethylene

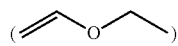

In one embodiment, the substituted amino group has a structure represented by the following Chemical Formula (3):

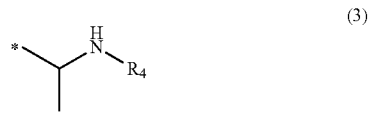

in which $R_4$ is selected from the group consisting of C1-C20 linear and branched alkyl, C3-C20 cycloalkyl, C6-C20 aryl, C1-C5 linear and branched carbonyl and a combination thereof.

The structure represented by Chemical Formula (3) can be prepared according to Scheme (3).

Scheme (3)

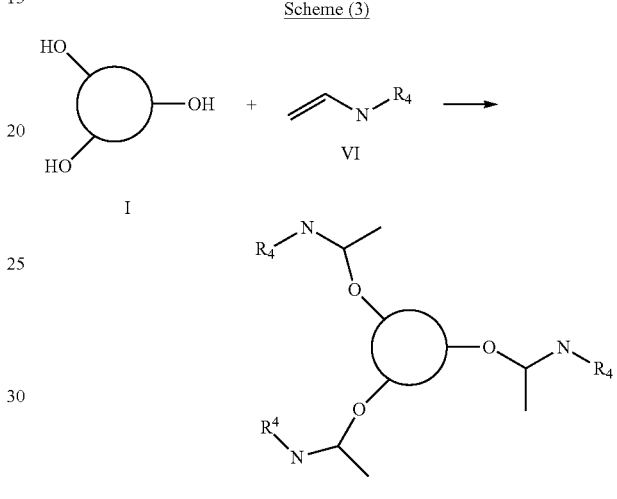

The inorganic nanoparticle I containing the hydroxyl groups is reacted with an amino group-containing compound VI. In one embodiment, $R_4$ is an ethyl group, that is, the amino group-containing compound VI is

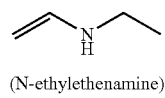

(N-ethylethenamine)

In one embodiment, the carbonyl group has a structure represented by the following Chemical Formula (4):

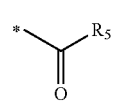

in which $R_5$ is selected from the group consisting of C1-C20 linear and branched alkyl, C3-C20 cycloalkyl, C6-C20 aryl, C1-C5 linear and branched haloformyl and a combination thereof. Preferably, the structure of the Chemical Formula (4) includes, but not limited to

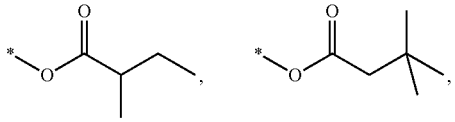

-continued

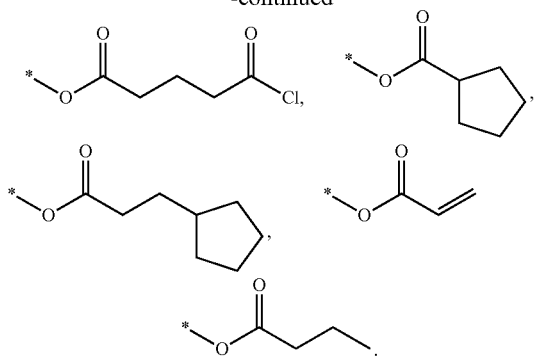
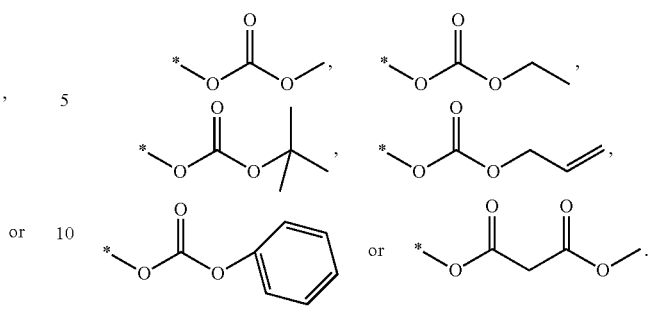

The structure represented by Chemical Formula (4) can be prepared according to Scheme (4).

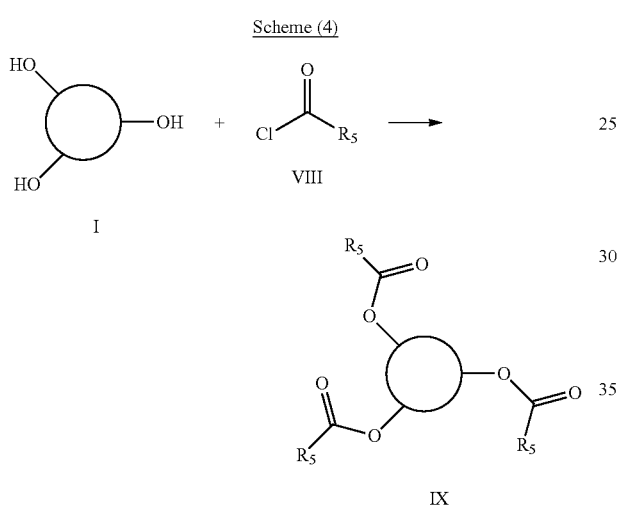

The structure represented by Chemical Formula (5) can be prepared according to Scheme (5).

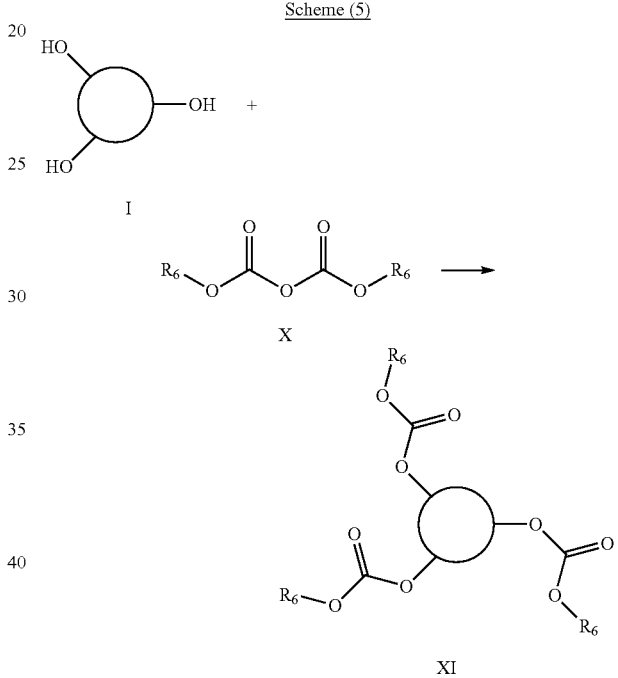

The inorganic nanoparticle I containing the hydroxyl groups is reacted with a carbonyl group-containing compound VIII. In one embodiment, $R_5$ is a propyl group, that is, the carbonyl group-containing compound VIII is butyryl chloride

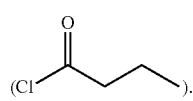

In one embodiment, the ester group has a structure represented by the following Chemical Formula (5):

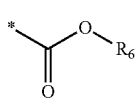
(5)

in which $R_6$ is selected from the group consisting of C1-C20 linear and branched alkyl, C6-C20 aryl, C1-C20 linear alkenyl and a combination thereof. Preferably, the structure of the Chemical Formula (5) includes, but not limited to The inorganic nanoparticle I containing the hydroxyl groups is reacted with a carboxylic group-containing compound X. In one embodiment, $R_6$ is a methyl group, that is, the carbonyl group-containing compound VIII is dimethyl dicarbonate

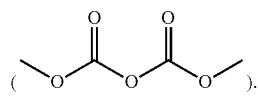

In one embodiment, the amide group has a structure represented by the following Chemical Formula (6):

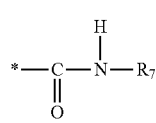
(6)

in which $R_7$ is selected from the group consisting of C1-C20 linear and branched alkyl, C6-C20 aryl, C1-C20 linear and branched isocyanato group, C6-C20 silane group and a combination thereof.

Preferably, the structure of the Chemical Formula (6) includes, but not limited to

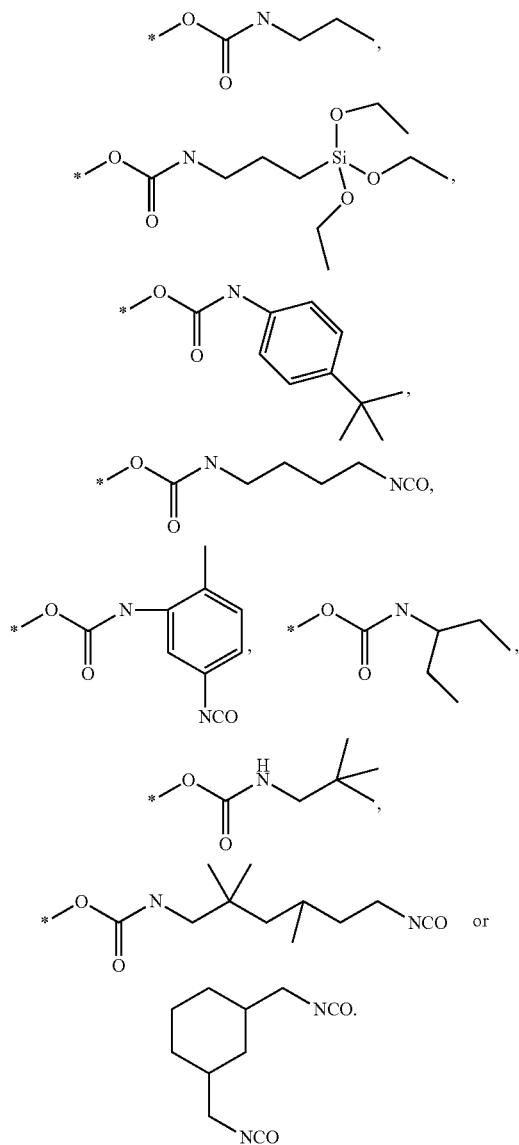

The structure represented by Chemical Formula (6) can be prepared according to Scheme (6).

Scheme (6)

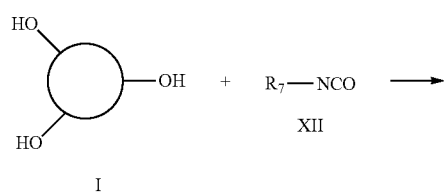

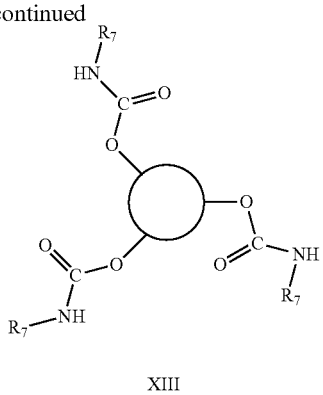

XIII

The inorganic nanoparticle I containing the hydroxyl groups is reacted with an amide group-containing compound XII. In one embodiment, $R_7$ is an ethyl group, that is, the amide group-containing compound XII is isocyanatoethane

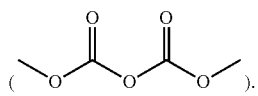

Embodiments

The following Examples are provided to illustrate certain aspects of the present disclosure and to aid those of skill in the art in practicing this disclosure. These Examples are in no way to be considered to limit the scope of the disclosure in any manner.

Preparation of Mixed Solutions Containing Modified or Unmodified Inorganic Particles Mixed Solution 1

1 g titanium dioxide and 5 g

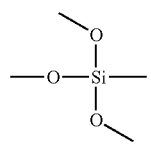

are added into 10 g acetonitrile and then heated at 45° C. for 2 hours to form Mixed Solution 1 containing surface-modified titanium dioxide with

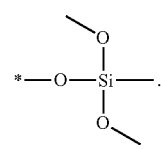

Mixed Solution 2

1 g zinc oxide and 5 g

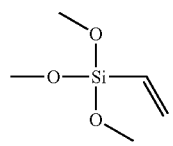

are added into 10 g acetonitrile and then heated at 45° C. for 2 hours to form the mixed solution 2 containing surface-modified zinc oxide with

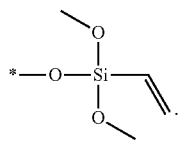

Mixed Solution 3
1 g titanium dioxide, 5 g

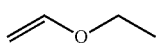

and 0.2 g HOAc are added into 10 g acetonitrile and then heated at 60° C. for 6 hours to form Mixed Solution 3 containing surface-modified titanium dioxide with

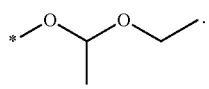 [SMILES: *OC(C)OCC]

Mixed Solution 4
1 g titanium dioxide, 5 g

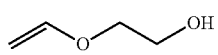

and 0.2 g HOAc are added into 10 g acetonitrile and then heated at 60° C. for 6 hours to form Mixed Solution 4 containing surface-modified titanium dioxide with

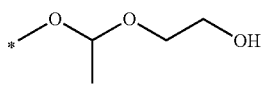

Mixed Solution 5
1 g titanium dioxide, 5 g

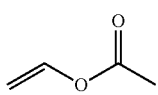

and 0.2 g HOAc are added into 10 g acetonitrile and then heated at 60° C. for 6 hours to form Mixed Solution 5 containing surface-modified titanium dioxide with

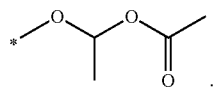

Mixed Solution 6
1 g titanium dioxide, 5 g

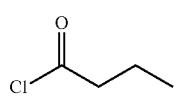

and 0.2 g HOAc are added into 10 g acetonitrile and then heated at 60° C. for 6 hours to form Mixed Solution 6 containing surface-modified titanium dioxide with

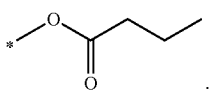

Mixed Solution 7
1 g titanium dioxide and 1 g

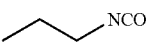

are added into 10 g acetonitrile and then heated at 45° C. for 6 hours to form Mixed Solution 7 containing surface-modified titanium dioxide with

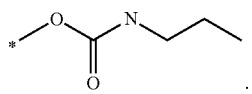

Mixed Solution 8
1 g titanium dioxide and 5 g

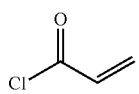

are added into 10 g acetonitrile and then heated at 45° C. for 6 hours to form Mixed Solution 8 containing surface-modified titanium dioxide with

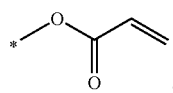

Mixed Solution 9
1 g titanium dioxide and 5 g

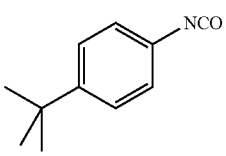

are added into 10 g acetonitrile and then heated at 45° C. for 6 hours to form Mixed Solution 9 containing surface-modified titanium dioxide with

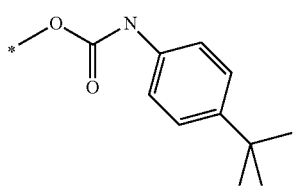

Mixed Solution 10
1 g zinc oxide and 5 g

are added into 10 g acetonitrile and then heated at 45° C. for 6 hours to form Mixed Solution 10 containing surface-modified zinc oxide with

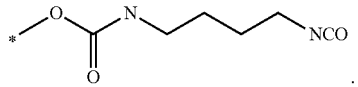

Mixed Solution 11
1 g titanium dioxide is added to 10 g acetonitrile to form Mixed Solution 11 containing unmodified titanium dioxide.
Mixed Solution 12
1 g zinc oxide is added to 10 g acetonitrile to form Mixed Solution 12 containing unmodified zinc oxide.
Mixed Solution 13
1 g silicon dioxide is added to 10 g acetonitrile to form Mixed Solution 13 containing unmodified silicon dioxide.
Mixed Solution 14
1 g silicon dioxide and 3 g

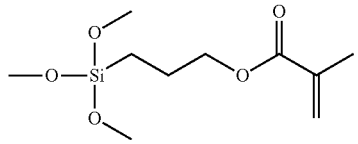 [SMILES: C=C(C)C(=O)OCCC[Si](OC)(OC)OC]

are added into 10 g 3-methoxypropionitrile and then heated at 45° C. for 2 hours to form Mixed Solution 14 containing surface-modified silicon dioxide with

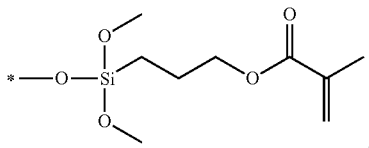

Mixed Solution 15
1 g titanium dioxide, 5 g

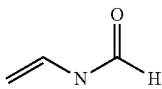

and 0.2 g HOAc are added into 10 g 3-methoxypropionitrile and then heated at 60° C. for 6 hours to form Mixed Solution 15 containing surface-modified titanium dioxide with

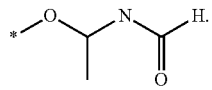

Mixed Solution 16
1 g titanium dioxide and 5 g

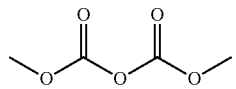

are added into 10 g 3-methoxypropionitrile and then heated at 45° C. for 2 hours to form Mixed Solution 16 containing surface-modified titanium dioxide with

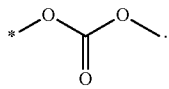

Mixed Solution 17
1 g titanium dioxide, 5 g

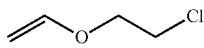

and 0.2 g HOAc are added into 10 g 3-methoxypropionitrile and then heated at 60° C. for 6 hours to form Mixed Solution 17 containing surface-modified titanium dioxide with

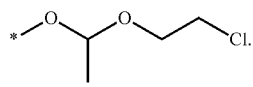 [SMILES: *OC(C)OCCCl]

Mixed Solution 18
1 g silicon dioxide and 5 g

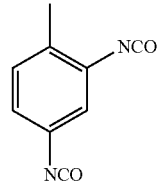

are added into 10 g 3-methoxypropionitrile and then heated at 45° C. for 2 hours to form Mixed Solution 18 containing surface-modified silicon dioxide with

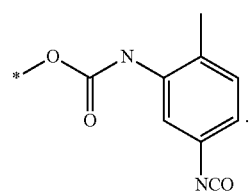

Preparation of Electrolyte Composition

Mixed Solutions 1-18 are respectively added to redox couple solution according to the adding amounts of the modified or unmodified inorganic nanoparticles listed in Table 1, and then uniformly mixed. The term "adding amount" refers to the adding amount of the inorganic nanoparticles based on the total weight of the electrolyte composition. The diameters of those inorganic particles of Mixed Solutions are listed in Table 1.

The redox couple solution includes 0.05 M iodine ($I_2$) solution, 0.1 M lithium iodide solution, 0.6 M 1,2-dimethyl-3-propylimidazolium iodide solution and 0.5M 4-tert-butylpyridine solution. The used solvents of those examples are listed in Table 1.

In addition, the electrolyte compositions of Comparative Example 1 and Comparative Example 2 only include the redox couple solution respectively, without any inorganic nanoparticle.

TABLE 1

|   | Solvent | Mixed Solution | Diameter of particle (nm) | Adding amount (%) |
|---|---|---|---|---|
| EXAMPLE 1 | ACN | Modified titanium dioxide mixed solution 1 | 8 | 0.5 |
| EXAMPLE 2 | ACN | Modified zinc oxide mixed solution 2 | 17 | 0.5 |
| EXAMPLE 3 | ACN | Modified titanium dioxide mixed solution 3 | 20 | 1 |
| EXAMPLE 4 | ACN | Modified titanium dioxide mixed solution 4 | 20 | 2 |
| EXAMPLE 5 | ACN | Modified titanium dioxide mixed solution 5 | 17 | 5 |
| EXAMPLE 6 | ACN | Modified titanium dioxide mixed solution 6 | 17 | 5 |
| EXAMPLE 7 | ACN | Modified titanium dioxide mixed solution 7 | 17 | 10 |
| EXAMPLE 8 | ACN | Modified titanium dioxide mixed solution 8 | 17 | 10 |
| EXAMPLE 9 | ACN | Modified titanium dioxide mixed solution 9 | 17 | 15 |
| EXAMPLE 10 | ACN | Modified zinc oxide mixed solution 10 | 17 | 15 |
| EXAMPLE 11 | ACN | Unmodified titanium dioxide mixed solution 11 | 17 | 5 |
| EXAMPLE 12 | ACN | Unmodified zinc oxide mixed solution 12 | 17 | 5 |
| EXAMPLE 13 | ACN | Unmodified titanium dioxide mixed solution 13 | 17 | 5 |
| EXAMPLE 14 | MPN | Modified silicon dioxide mixed solution 14 | 25 | 1 |
| EXAMPLE 15 | MPN | Modified titanium dioxide mixed solution 15 | 8 | 2 |
| EXAMPLE 16 | MPN | Modified titanium dioxide mixed solution 16 | 20 | 5 |
| EXAMPLE 17 | MPN | Modified titanium dioxide mixed solution 17 | 17 | 10 |
| EXAMPLE 18 | MPN | Modified silicon dioxide mixed solution 18 | 17 | 15 |
| Comparative Example 1 | ACN | None | — | — |
| Comparative Example 2 | MPN | None | — | — |

Manufacture of Solar Cell

The dye-sensitized solar cell (DSSC) of the present disclosure can be prepared by any conventional method known to those skilled in the art. For an example, the method includes the steps below:

(1) coating a compound semiconductor material (specific surface area is 20 m$^2$/g) on a FTO glass substrate (area is about 0.7×1.6 cm) to form a thin film with a thickness of about 11-12 μm, and the compound semiconductor material includes first semiconductor particles (titanium dioxide ST41 with a particle size in a range of 100-300 nm and a specific surface area of 6 m$^2$/g, produced by ISK Company) and inorganic particles (titanium dioxide HT with a particle size in a range of 20-50 nm and a specific surface area of 85 m$^2$/g, produced by Eternal Company);

(2) sintering the FTO glass substrate with the titanium dioxide film at 400-600° C. to form an electrode;

(3) forming a second electrode of platinum with a thickness of about 20 nm on another glass substrate by a screen printing method;

(4) immersing the electrode of step (2) in dye photosensitizing solution (N719 (produced by Solaronix Company) dissolved in a solvent with 1:1 ratio of n-butanol to acetonitrile) for 12-24 hours to absorb the dye photosensitizing agent; and (5) injecting the electrolyte solution.

Cell Performance Test

The above-mentioned DSSCs are tested under the condition of AM 1.5 simulated sunlight (light intensity (P) of 100 mW/cm$^2$), and the test results are listed in Table 2. The term "AM 1.5" represents Air Mass 1.5, in which AM=1/cos(θ), and θ refers to the angle deviated from the perpendicular incident light. The cell performance test usually uses AM 1.5 (θ=48.21 the average illumination of the United States of America, as the average illumination of sunlight on the ground surface (25° C.), and the light intensity is about 100 mW/cm$^2$.

TABLE 2

|   | η (%) | Voc (V) | Jsc (mA/cm$^2$) | FF (%) |
|---|---|---|---|---|
| EXAMPLE 1 | 5.795 | 0.78 | 1.76 | 0.676 |
| EXAMPLE 2 | 5.722 | 0.76 | 1.88 | 0.639 |
| EXAMPLE 3 | 5.730 | 0.78 | 1.69 | 0.694 |
| EXAMPLE 4 | 5.801 | 0.78 | 1.77 | 0.670 |
| EXAMPLE 5 | 5.957 | 0.76 | 1.87 | 0.671 |
| EXAMPLE 6 | 5.907 | 0.78 | 1.75 | 0.692 |
| EXAMPLE 7 | 6.032 | 0.76 | 1.85 | 0.687 |
| EXAMPLE 8 | 6.053 | 0.74 | 1.92 | 0.681 |
| EXAMPLE 9 | 6.254 | 0.78 | 1.88 | 0.681 |
| EXAMPLE 10 | 6.079 | 0.78 | 1.78 | 0.700 |
| EXAMPLE 11 | 5.652 | 0.78 | 1.73 | 0.670 |
| EXAMPLE 12 | 5.673 | 0.80 | 1.67 | 0.679 |
| EXAMPLE 13 | 5.641 | 0.74 | 1.86 | 0.656 |
| EXAMPLE 14 | 5.174 | 0.76 | 1.71 | 0.636 |
| EXAMPLE 15 | 5.115 | 0.76 | 1.77 | 0.608 |
| EXAMPLE 16 | 5.317 | 0.78 | 1.62 | 0.675 |
| EXAMPLE 17 | 5.332 | 0.78 | 1.71 | 0.638 |
| EXAMPLE 18 | 5.414 | 0.78 | 1.66 | 0.669 |
| Comparative Example 1 | 5.292 | 0.76 | 1.71 | 0.669 |
| Comparative Example 2 | 4.589 | 0.78 | 1.43 | 0.657 |

In Comparative Examples 1 and 2, the electrolyte solution without inorganic nanoparticles has photoelectric conversion efficiency lower than or equal to 5.3.

Each of the photoelectric conversion efficiencies of Examples 1-13 is greater than that of Comparative Example 1, and each of the photoelectric conversion efficiencies of Examples 14-18 is greater than that of Comparative Example 2. It represents that the inorganic nanoparticles of the electrolyte solution can be utilized to effectively increase the photoelectric conversion efficiency of the solar cell.

In addition, in Examples 1-10, the electrolyte solution having the modified inorganic nanoparticles has higher photoelectric conversion efficiency than that of the electrolyte solution having the unmodified inorganic nanoparticles. Also, in a sedimentation test, the unmodified inorganic nanoparticles of Examples 11-13 are significantly subsided after 1 day, but the modified inorganic nanoparticles of Examples 1-10 and Examples 14-18 are not subsided within 90 days. Therefore, the modified inorganic nanoparticles of the present disclosure have a good dispersing property and stability.

In summary, the inorganic nanoparticles of the electrolyte for the DSSC in the embodiments of the present disclosure, which can be used to increase light-scattering effect and ion conducting efficiency, are successfully developed. Further, the modified inorganic nanoparticles can be used to avoid sedimentation and to further increase light-scattering effect and ion conducting efficiency. Thus, those inorganic nanoparticles can be effectively applied to various electrolyte compositions to increase the photoelectric conversion efficiency of the solar cell.

Although the present disclosure has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations may be made to the structure of the present disclosure without departing from the scope or spirit of the disclosure. In view of the foregoing, it is intended that the present disclosure cover modifications and variations thereof provided they fall within the scope of the following claims.

What is claimed is:

1. An electrolyte composition for a dye-sensitized solar cell (DSSC), comprising:
   a redox couple solution; and
   an inorganic nanoparticle selected from the group consisting of titanium dioxide, silicon dioxide, zinc oxide, aluminum oxide, cadmium sulfide, zirconium oxide, calcium phosphate and a combination thereof, wherein the surface of the inorganic nanoparticle comprises a substituted or unsubstituted silane group, an ether group, a substituted amino group, a carbonyl group, an ester group, an amide group or a combination thereof, and wherein the substituted or unsubstituted silane group has a structure represented by the following Chemical Formula (1):

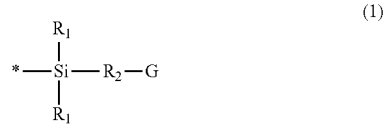

(1)

wherein $R_1$ is selected from the group consisting of H, OH, $OCH_3$, $OC_2H_5$ and $OCOCH_3$, and $R_2$ is selected from the group consisting of C1-C7 linear and branched alkyl and G is selected from the group consisting of $CH_3$, $C_2H_4$, $CF_3$, Cl, $NH_2$, $N(CH_3)$, cyclopentane and

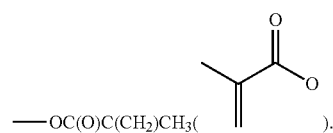

2. The electrolyte composition of claim 1, wherein the inorganic nanoparticle has a content of from 0.1 to 20 wt %, based on the total weight of the electrolyte composition.

3. The electrolyte composition of claim 1, wherein the inorganic nanoparticle has a diameter in a range of 1 to 100 nm.

4. The electrolyte composition of claim 1, wherein the surface of the inorganic nanoparticle comprises the ether group, and wherein the ether group has a structure represented by the following Chemical Formula (2):

(2)

wherein $R_3$ is selected from the group consisting of C1-C20 linear and branched alkyl, C3-C20 cycloalkyl, C6-C20 aryl, C1-C5 linear and branched hydroxyl, C1-C5 linear and branched carbonyl, C1-C5 linear and branched halo group and a combination thereof.

5. The electrolyte composition of claim 1, wherein the surface of the inorganic nanoparticle comprises the substituted amino group, and wherein the substituted amino group has a structure represented by the following Chemical Formula (3):

(3)

wherein $R_4$ is selected from the group consisting of C1-C20 linear and branched alkyl, C3-C20 cycloalkyl, C6-C20 aryl, C1-C5 linear and branched carbonyl and a combination thereof.

6. The electrolyte composition of claim 1, wherein the surface of the inorganic nanoparticle comprises the carbonyl group, and wherein the carbonyl group has a structure represented by the following Chemical Formula (4):

(4)

wherein $R_5$ is selected from the group consisting of C1-C20 linear and branched alkyl, C3-C20 cycloalkyl, C6-C20 aryl, C1-C5 linear and branched haloformyl and a combination thereof.

7. The electrolyte composition of claim 1, wherein the surface of the inorganic nanoparticle comprises the ester group, and wherein the ester group has a structure represented by the following Chemical Formula (5):

(5)

wherein $R_6$ is selected from the group consisting of C1-C20 linear and branched alkyl, C6-C20 aryl, C1-C20 linear alkenyl and a combination thereof.

8. The electrolyte composition of claim 1, wherein the surface of the inorganic nanoparticle comprises the amide group, and wherein the amide group has a structure represented by the following Chemical Formula (6):

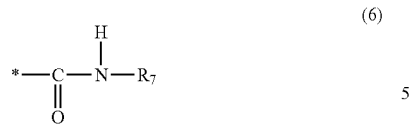 (6)
wherein $R_7$ is selected from the group consisting of C1-C20 linear and branched alkyl, C6-C20 aryl, C1-C20 linear and branched isocyanato group, C6-C20 silane group and a combination thereof.
9. The electrolyte composition of claim 1, wherein the redox couple solution has a redox couple which is $I_3^-/I^-$, $Br^-/Br_2$, Co(II)/Co(III), $SCN^-/(SCN)_2$ or $SeCN^-/(SeCN)_2$.
* * * * *